United States Patent
Hales et al.

(10) Patent No.: US 8,296,011 B2
(45) Date of Patent: Oct. 23, 2012

(54) SYSTEMS AND METHODS INVOLVING QUADRANT DEPENDENT ACTIVE DAMPING

(75) Inventors: Michael K Hales, Midland, MI (US); Anthony J Champagne, Saginaw, MI (US)

(73) Assignee: Steering Solutions IP Holding Corporations, Saginaw, MI (US)

( * ) Notice: Subject to any disclaimer, the term of this patent is extended or adjusted under 35 U.S.C. 154(b) by 900 days.

(21) Appl. No.: 11/955,347

(22) Filed: Dec. 12, 2007

(65) Prior Publication Data

US 2009/0157258 A1 Jun. 18, 2009

(51) Int. Cl.
*G05D 1/00* (2006.01)
(52) U.S. Cl. .......................................................... 701/41
(58) Field of Classification Search ................... 180/443, 180/446; 701/41, 42
See application file for complete search history.

(56) References Cited

U.S. PATENT DOCUMENTS

| | | | |
|---|---|---|---|
| 4,875,541 A * | 10/1989 | Oshita et al. ................... 180/446 |
| 5,182,711 A * | 1/1993 | Takahashi et al. ............... 701/41 |
| 5,469,357 A * | 11/1995 | Nishimoto ...................... 701/41 |
| 5,596,252 A | 1/1997 | Shimizu et al. |
| 5,600,559 A * | 2/1997 | Nishimoto et al. ............. 701/41 |
| 5,698,956 A * | 12/1997 | Nishino et al. ................. 318/432 |
| 5,894,205 A * | 4/1999 | Shimizu et al. ................ 318/432 |
| 5,919,241 A | 7/1999 | Bolourchi et al. |
| 5,978,721 A * | 11/1999 | Kagawa et al. ................. 701/41 |
| 5,984,042 A * | 11/1999 | Nishimoto et al. ........... 180/446 |
| 5,992,556 A * | 11/1999 | Miller ........................... 180/446 |
| 6,129,172 A * | 10/2000 | Yoshida et al. ............... 180/446 |
| 6,272,410 B2 * | 8/2001 | Okanoue et al. ................. 701/42 |
| 6,876,911 B2 * | 4/2005 | Chen et al. ...................... 701/41 |
| 7,275,617 B2 * | 10/2007 | Endo et al. ..................... 180/402 |
| 7,292,919 B2 * | 11/2007 | Sakai .............................. 701/41 |
| 2006/0069481 A1 * | 3/2006 | Kubota et al. .................. 701/41 |
| 2007/0100524 A1 * | 5/2007 | Sakaguchi et al. ............. 701/41 |
| 2008/0023256 A1 | 1/2008 | Krieger et al. |
| 2009/0055049 A1 * | 2/2009 | Sakaguchi et al. ............. 701/41 |

(Continued)

FOREIGN PATENT DOCUMENTS

EP 0398238 A1 11/1990

(Continued)

OTHER PUBLICATIONS

European Search Report and Office Action dated Aug. 10, 2009 for European Application No. 08169686.6.

(Continued)

*Primary Examiner* — John Nguyen
*Assistant Examiner* — Michael Whalen
(74) *Attorney, Agent, or Firm* — Cantor Colburn LLP (57) ABSTRACT

A method for controlling a steering system, including, receiving a first signal representative of a torque applied to a steering wheel, receiving a second signal representative of a motor velocity of a motor operatively linked to the steering wheel, multiplying the first signal with the second signal resulting in a product signal, applying a backlash function to the product signal, wherein the backlash function imparts a defined hysteresis in the system, multiplying a defined first-third quadrant scaling factor with an active damping signal, and sending a resultant motor command signal to the motor responsive to determining that the product signal is a positive signal, and multiplying a defined second-fourth quadrant scaling factor with the active damping signal, and sending the resultant motor command signal to the motor responsive to determining that the product signal is a negative signal.

13 Claims, 5 Drawing Sheets

U.S. PATENT DOCUMENTS

| | | | |
|---|---|---|---|
| 2009/0069979 A1* | 3/2009 | Yamashita et al. | 701/42 |
| 2009/0254253 A1* | 10/2009 | Ghoneim et al. | 701/42 |
| 2009/0312909 A1* | 12/2009 | Onuma | 701/41 |
| 2009/0319128 A1* | 12/2009 | Lauer et al. | 701/42 |
| 2010/0121531 A1* | 5/2010 | Oniwa et al. | 701/41 |
| 2010/0161178 A1* | 6/2010 | Kodaira et al. | 701/41 |
| 2010/0286871 A1* | 11/2010 | Kobayashi et al. | 701/41 |

FOREIGN PATENT DOCUMENTS

| | | | |
|---|---|---|---|
| EP | 0654393 A1 | 5/1995 | |
| EP | 0709277 A1 | 5/1996 | |
| EP | 0966093 A2 | 12/1999 | |
| WO | 0177812 A1 | 10/2001 | |

OTHER PUBLICATIONS

European Search Report Opinion dated Aug. 10, 2009 for European Application No. 08169686.6.

* cited by examiner

SYSTEMS AND METHODS INVOLVING QUADRANT DEPENDENT ACTIVE DAMPING

BACKGROUND

Power steering systems in vehicles often employ assist algorithms that are non-linear in nature. Such systems apply different amounts of torque to turn the wheels of vehicles in which they are employed depending upon the driving conditions, speed of the vehicle, and user input. During the application of the differing amounts of torque, it is desirable that the system provide a smooth and linear tactile response at the steering wheel. It may be desirable to use different damping values in the control system depending on the inputs to the system to result in a linear tactile response.

In operation, a user applies an amount of torque, generally manually, to a steering input device at a particular velocity. The steering input device transfers this torque and velocity to a motor that responsively turns the wheels of the vehicle through appropriate linkages. The applied torque and the velocity of the steering wheel are input into a controller that controls the motor. The controller applies damping signals to the motor to provide a smooth, linear tactile response for the user when the user turns the steering wheel.

Users apply different torque at different velocities to the steering wheel while controlling the vehicle. For example, when initiating a left turn, the user turns the steering wheel to the left thereby applying a positive torque at a positive velocity to the motor. While in the left turn, a user may adjust the arc of the turn by moving the steering wheel slightly to the right. The movement of the steering wheel slightly to the right applies a positive torque and at a negative velocity to the motor. Since the movement of the steering wheel to initiate a turn and the slight movement of the steering wheel that is used to adjust the turn are different, it is desirable that the damping used during the two motions be different in order to effect a smooth tactile feel to the user. The use of different damping depending on the operation of the steering wheel may be implemented using quadrant damping.

Figure 1:
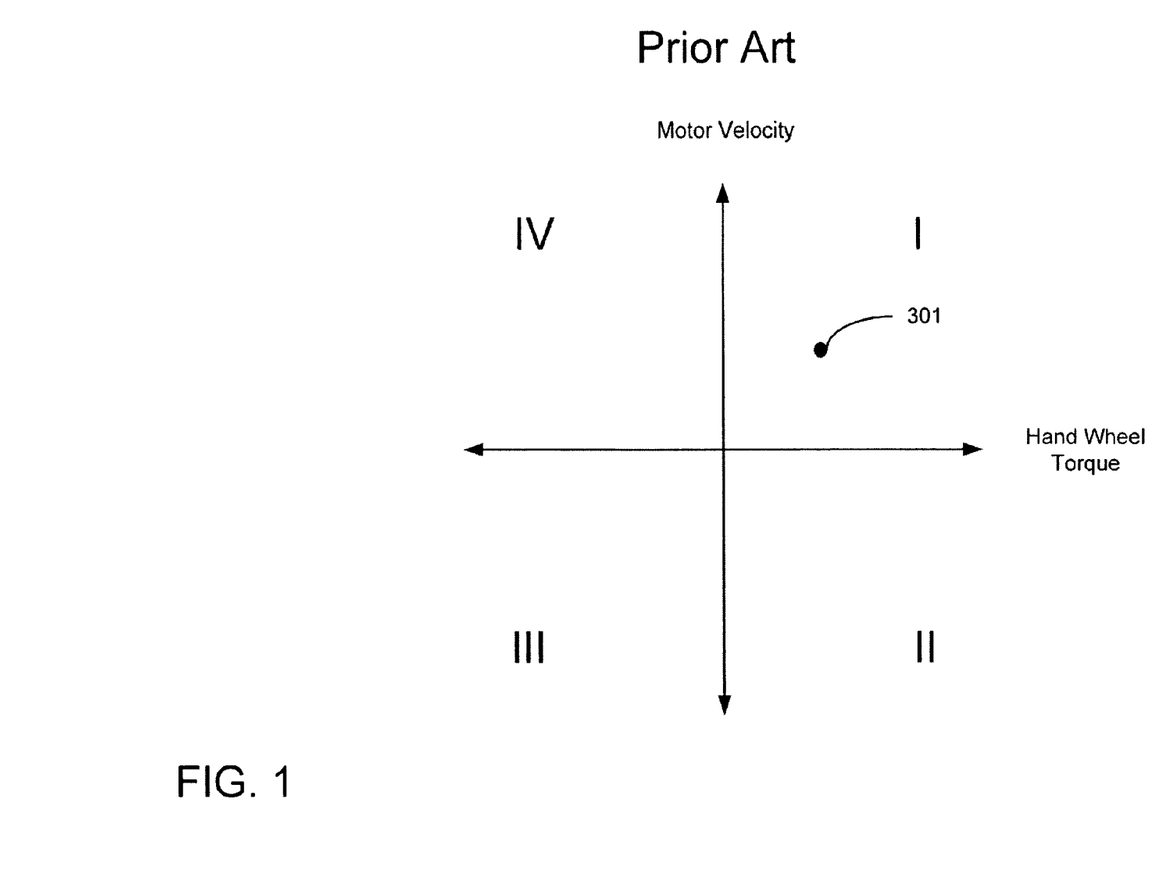
FIG. 1 is a prior art example of a graph of quadrants in a quadrant dependent active damping system.

FIG. 1 illustrates a prior art example of steering quadrants. The graph includes a y-axis defined as the motor velocity and an x-axis defined as the hand wheel torque. Quadrant I is defined as a motor operating condition wherein the applied torque signal and the motor velocity are both positive. Point 301 is an example of an input in Quadrant I. Quadrant II is defined as a motor operating condition wherein the applied torque signal is positive, but the motor velocity is negative. In quadrant III, the applied torque signal and the motor velocity are both negative. In Quadrant IV, the applied torque signal is negative, but the motor velocity is positive. Quadrant III mirrors Quadrant I, but with opposite signs for motor velocity and applied torque signals. Similarly, Quadrant IV mirrors Quadrant II, but with opposite signs for motor velocity and applied torque signals.

SUMMARY

The above described and other features are exemplified by the following Figures and Description in which a power steering system is disclosed that includes A method for controlling a power steering system, the method including, receiving a first signal representative of a torque applied to a steering wheel, applying a first backlash function to the first signal, wherein the first backlash function imparts a defined first hysteresis in the system, receiving a second signal representative of a motor velocity of a motor operatively linked to the steering wheel, applying a second backlash function to the second signal, wherein the second backlash function imparts a defined second hysteresis in the system, multiplying the first signal with the second signal resulting in a product signal, multiplying a defined first-third quadrant scaling factor with an active damping signal, and sending a resultant motor command signal to the motor responsive to determining that the product signal is a positive signal, and multiplying a defined second-fourth quadrant scaling factor with the active damping signal, and sending the resultant motor command signal to the motor responsive to determining that the product signal is a negative signal.

A method for controlling a power steering system, the method including, A method for controlling a steering system, including, receiving a first signal representative of a torque applied to a steering wheel, receiving a second signal representative of a motor velocity of a motor operatively linked to the steering wheel, multiplying the first signal with the second signal resulting in a product signal, applying a backlash function to the product signal, wherein the backlash function imparts a defined hysteresis in the system, multiplying a defined first-third quadrant scaling factor with an active damping signal, and sending a resultant motor command signal to the motor responsive to determining that the product signal is a positive signal, and multiplying a defined second-fourth quadrant scaling factor with the active damping signal, and sending the resultant motor command signal to the motor responsive to determining that the product signal is a negative signal.

An alternate embodiment of a method for controlling a power steering system, the method including, receiving a first signal representative of a torque applied to a steering wheel, applying a first backlash function to the first signal, wherein the first backlash function imparts a defined first hysteresis in the system, receiving a second signal representative of a motor velocity of a motor operatively linked to the steering wheel, applying a second backlash function to the second signal, wherein the second backlash function imparts a defined second hysteresis in the system, multiplying the first signal with the second signal resulting in a product signal, multiplying a defined first-third quadrant scaling factor with an active damping signal, and sending a resultant motor command signal to the motor responsive to determining that the product signal is a positive signal, and multiplying a defined second-fourth quadrant scaling factor with the active damping signal, and sending the resultant motor command signal to the motor responsive to determining that the product signal is a negative signal.

BRIEF DESCRIPTION OF THE DRAWINGS

Referring now to the Figures wherein like elements are numbered alike.

DETAILED DESCRIPTION

In order to impart a stable tactile response to a steering system, input-dependent active damping may be utilized. An example of such a technique is presented in U.S. Pat. No. 5,919,241, Vehicle leaving Electric Power Steering With Active Damping, filed Dec. 13, 1996 and U.S. patent application Ser. No. 11/495,219 ("the '219 application"), Quadrant Dependent Active Damping for Electric Power Steering, filed Jul. 28, 2006 incorporated by reference herein in their entirety and assigned to the assignee of the present application. In the '219 application active damping is applied to a steering system using quadrants. However, quick changes between quadrants result in a system that rapidly shifts damping values, causing the tactile response of the system to have a non-linear feel for the user.

Figure 3:
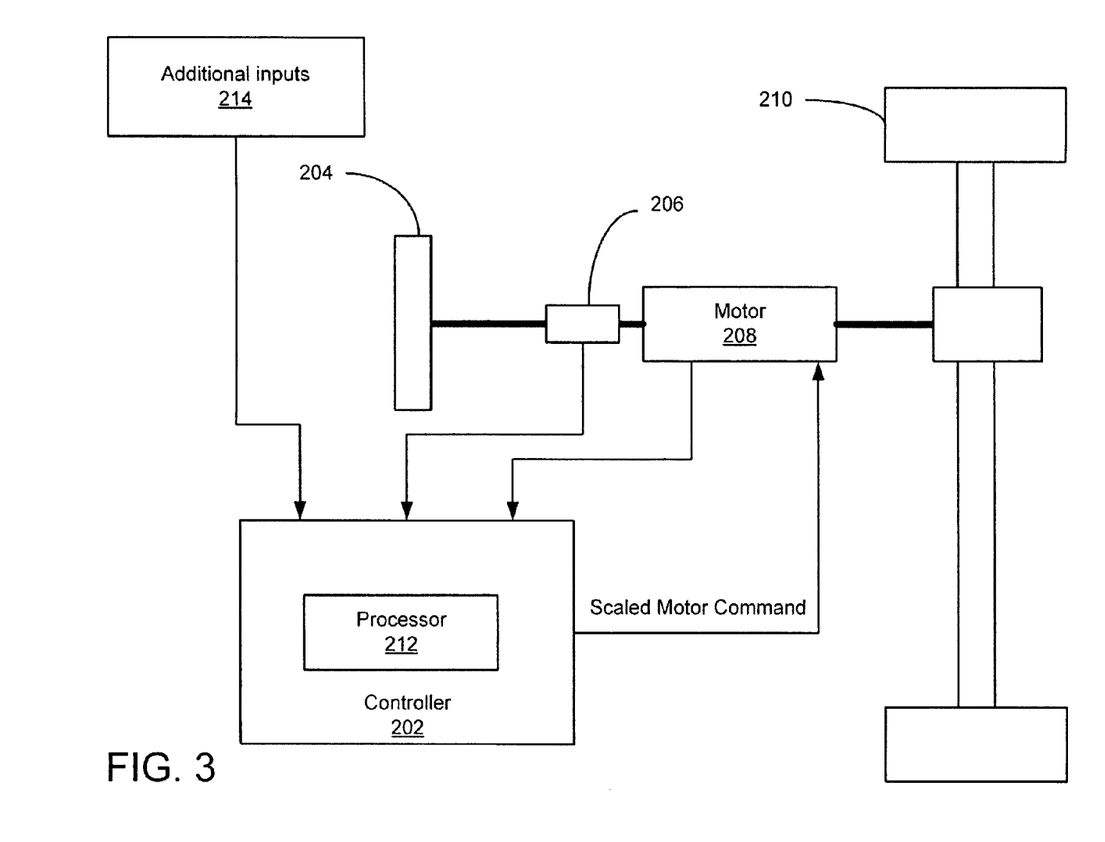
FIG. 3 is a block diagram of a quadrant dependent active damping system.

FIG. 3 illustrates a block diagram of an exemplary embodiment of a quadrant dependent active damping system. The system includes a steering wheel 204 linked to a motor 208 that is linked to a wheel assembly 210. A torque sensor 206 is also linked to the steering wheel 204. A controller 202 that includes a processor 212 is communicatively linked to the torque sensor 206 and the motor 208. The controller 202 may also receive other inputs (not shown) including, for example vehicle speed.

Figure 2:
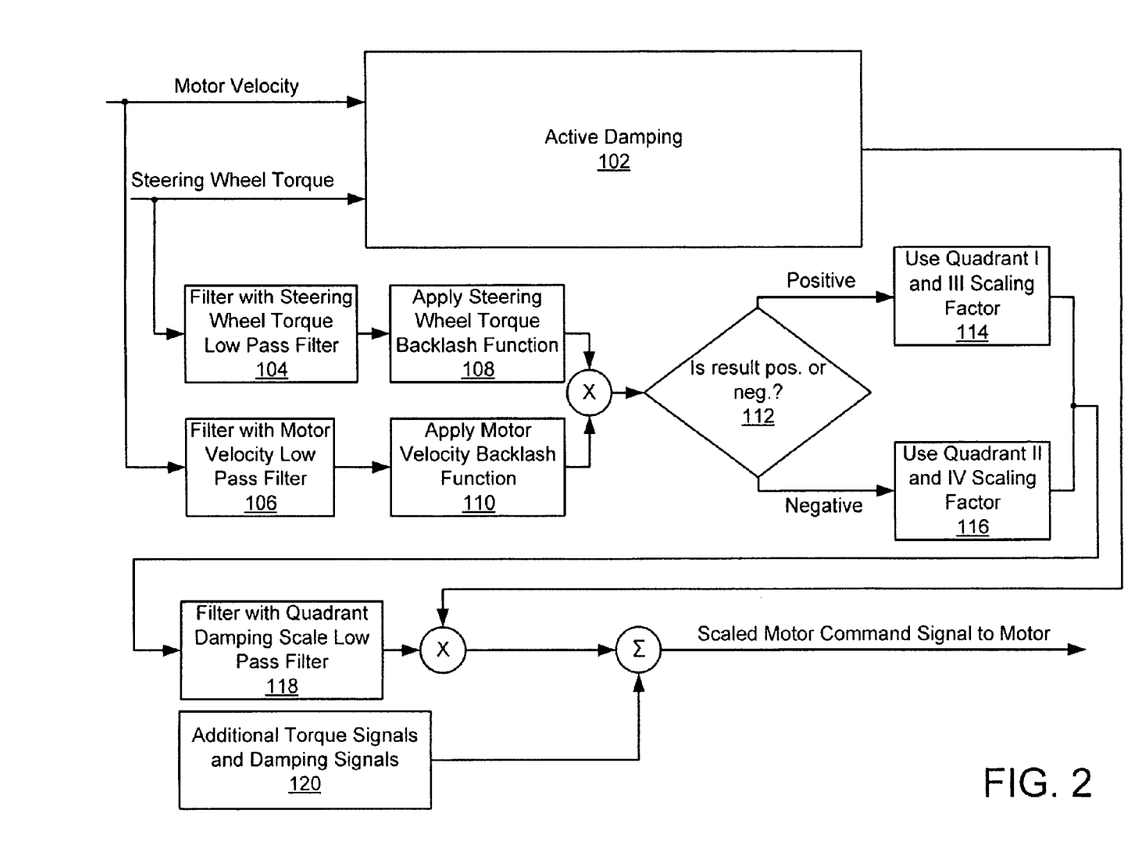
FIG. 2 is a block diagram of a method for controlling steering using a quadrant-dependent active damping system.

FIG. 2 illustrates an exemplary method for controlling a steering system. In this regard, the processor 212 (of FIG. 3) receives a steering wheel torque signal from the torque sensor 206 and a motor velocity signal from the motor 208. In some embodiments, the motor 208 may output a position signal that may be converted into a motor velocity signal by the processor 212. The motor velocity signal and the steering wheel torque signal may be damped in the active damping block 102. The steering wheel torque signal may be filtered with a low-pass filter in block 104 that acts to mitigate rapidly changing quadrant values. A backlash function is then applied to the steering wheel torque signal in block 108 that induces a defined amount of hysteresis in the system. The backlash function acts to further mitigate rapidly changing quadrant values. Referring to block 106, the motor velocity signal is filtered with a low-pass filter. A backlash function is applied to the motor velocity signal in block 110. The low-pass filter and the backlash function in blocks 106 and 110 for the motor velocity signal may be different from the low-pass filter and backlash function in blocks 104 and 108 for the steering wheel torque signal depending on design characteristics of the system.

After the backlash functions have been applied to the steering wheel torque signal and the motor velocity signal in blocks 108 and 110, the processor 212 multiplies the signals to result in a product signal. The processor 212 determines whether the product signal is negative or positive in block 112. If the product signal is positive, the motor velocity signal and steering wheel signal have the same signs, and thus would be plotted in Quadrant I or Quadrant III of FIG. 1. If the product signal is negative, the motor velocity signal and steering wheel signal have different signs, and would be plotted in Quadrant II or Quadrant IV of FIG. 1.

Quadrant scaling factors are defined for Quadrant I and Quadrant III in block 114, and for Quadrant II and Quadrant IV in block 116. Each of the quadrant scaling factors may be defined based on design considerations of the system. The processor 212 sends the applicable quadrant scaling factor to be multiplied with an active damping signal from block 102. For example if the product signal is positive the processor 212 will send the quadrant scaling factor defined for Quadrant I and Quadrant III (first-third quadrant scaling factor) in block 114 to be multiplied with the active damping signal from block 102. A low-pass filter may be used to filter the quadrant scaling factor in block 118 prior to multiplication with the active damping signal. The low-pass filter of block 118 slows an immediate change in the scaling factor, resulting in a more gradual change to the scaling than an unfiltered quadrant scaling factor. The resultant signal from the product of the quadrant scaling factor and the active damping signal may be summed with additional torque and damping signals in the system from block 120. Finally, a scaled motor command signal is sent to the motor 208.

A rapid changing of the quadrant scaling factor caused by, for example, a user making small rapid movements of the steering wheel 204, a rapid variation in motor velocity signals, and a steering wheel 204 torque signal result in rapid changes in the damping of the system and a non-linear feel to the user. By applying the backlash function to the steering wheel torque signal and the motor velocity signal, hysteresis is induced into the system. The hysteresis prevents small rapid changes in steering wheel torque signal and the motor velocity signal from changing the sign of the product signal and in turn the quadrant scaling factor.

Figure 4:
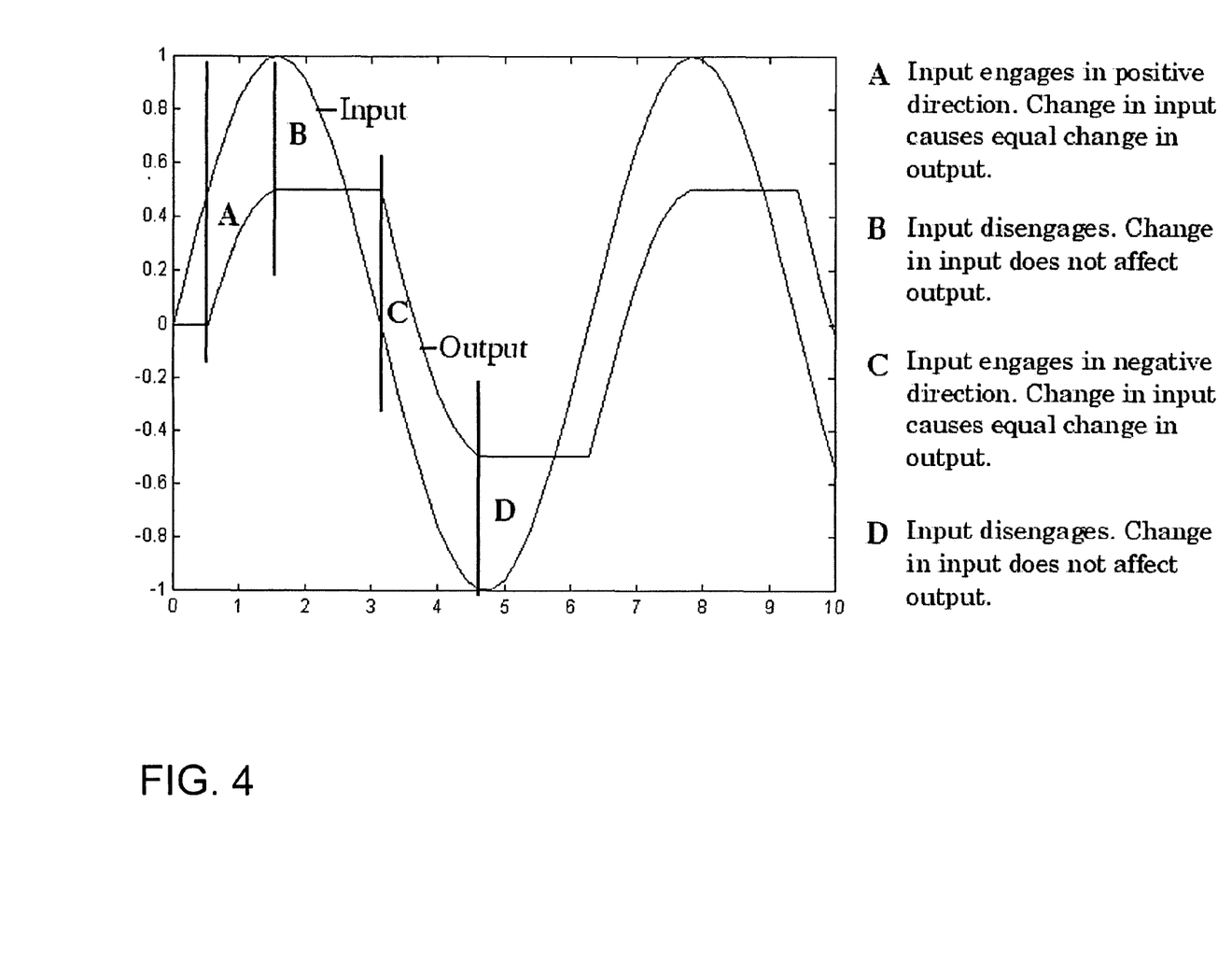
FIG. 4 is a graph illustrating the operation of a backlash function in a quadrant dependent active damping system.

In operation the backlash functions of blocks 108 and 110 allow a change in input to the system to cause an equal change in output. When the input changes direction, an initial change in input has no effect on the output. The amount of initial change that has no effect on the Output is called the deadband. The deadband is defined based on desired performance characteristics of the system. An exemplary embodiment of a backlash function may be defined as a current output=y, a current input=x, a previous output, yprev and a deadband, d:

if $x<y\text{prev}-d/2, y=x+d/2,$ else if $x<=y\text{prev}+d/2, y=y\text{prev}$ else $y=x-d/2$ FIG. 4 illustrates an example of the operation of the backlash function having a deadband value of 1. Referring to FIG. 4, when the input equals 0.5 at A, the input is engaged in a positive direction, and a change in the input results in an equal change in the output. When the input changes from positive to a negative slope at B, the input disengages, and a change in input does not affect the output. At C, the input engages in a negative direction and a change in the input results in an equal change in the output. When the input changes from a negative slope to a positive slope at D, the input disengages and the input does not affect the output.

Figure 5:
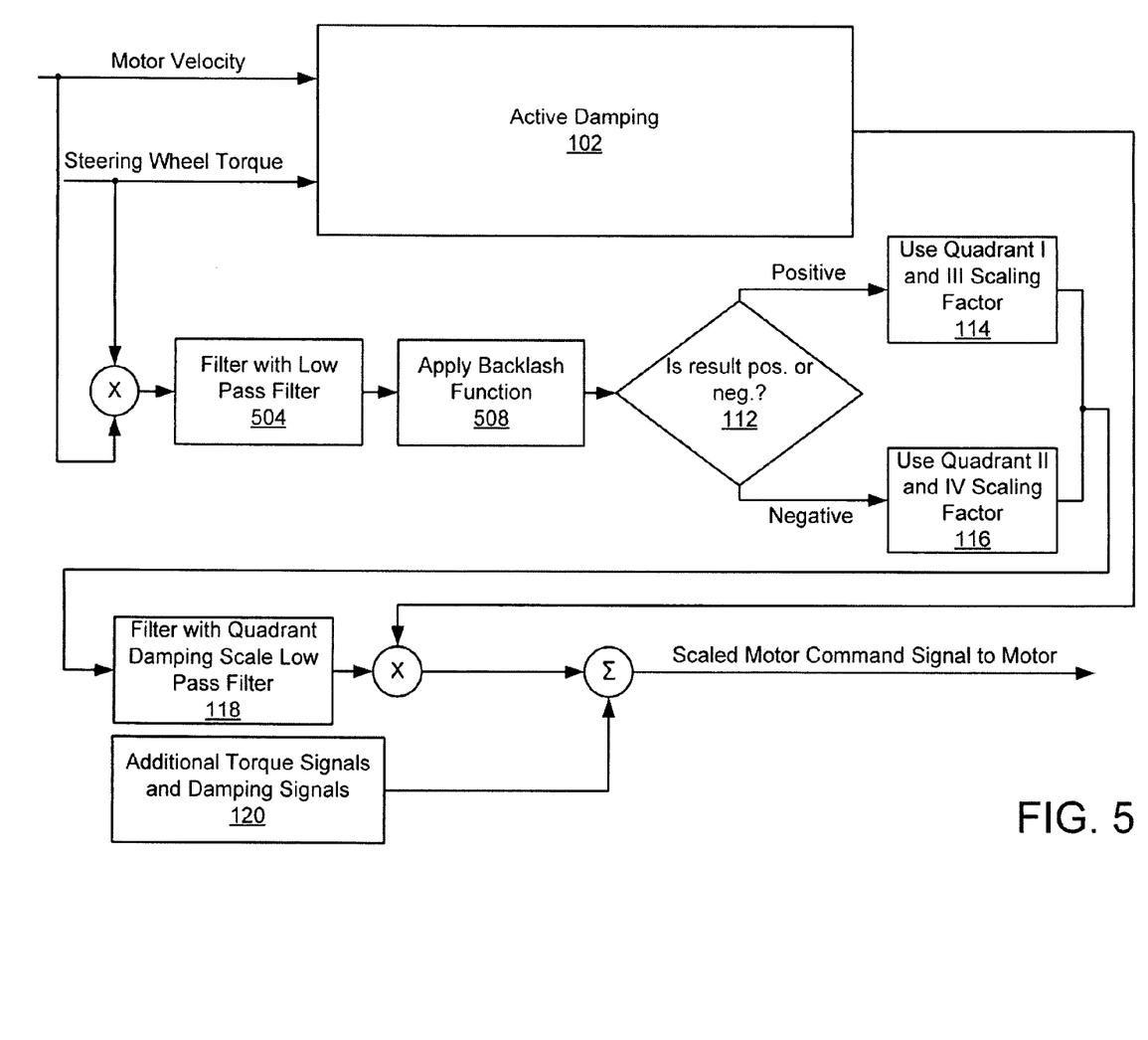
FIG. 5 is a block diagram of an alternative method for controlling steering using a quadrant-dependent active damping system.

FIG. 5 illustrates an alternate embodiment of a method for controlling a steering system. The method illustrated is similar to the method in FIG. 2, however the steering wheel torque signal and the motor velocity signal are multiplied resulting in a product signal that may then be filtered by a low-pass filter in block 504. A backlash function is applied to the product signal in block 508. The remaining steps in the method are similar to the method illustrated in FIG. 2.

In the method illustrated in FIG. 5, the low-pass filter and the backlash functions in blocks 504 and 508 affect both the steering wheel torque signal and the motor velocity signal. While the method illustrated in FIG. 2 allows different low-pass filters and different backlash functions to be defined according to the steering wheel torque signal and the motor velocity signal individually. Using the method of FIG. 5 allows faster processing time because the processor 212 does not perform as many calculations as the method of FIG. 2.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling a power steering system, the method including:
   receiving a first signal representative of a torque applied to a steering wheel;
   applying a first backlash function to the first signal, wherein the first backlash function includes a first adjustable deadband center and imparts a defined first hysteresis in the system, the first adjustable deadband center adjusts based on a value of the first signal and whether the value is increasing or decreasing;
   receiving a second signal representative of a motor velocity of a motor operatively linked to the steering wheel;
   applying a second backlash function to the second signal, wherein the second backlash function includes a second adjustable deadband center and imparts a defined second hysteresis in the system, the second adjustable deadband center adjusts on a value of the second signal and whether the value is increasing or decreasing;
   multiplying the first signal with the second signal resulting in a product signal;
   multiplying a defined first-third quadrant scaling factor with an active damping signal, and sending a resultant motor command signal to the motor responsive to determining that the product signal is a positive signal; and
   multiplying a defined second-fourth quadrant scaling factor with the active damping signal, and sending the resultant motor command signal to the motor responsive to determining that the product signal is a negative signal.

2. The method of claim 1, further comprising:
   filtering the first signal with a first low-pass filter responsive to receiving the first signal; and
   filtering the second signal with a second low-pass filter responsive to receiving the second signal.

3. The method of claim 1, further comprising:
   adding a second damping signal to the resultant motor command signal to define a scaled motor command signal; and
   sending the scaled motor command signal to the motor.

4. The method of claim 1, further comprising:
   adding a second torque signal to the resultant motor command signal to define a scaled motor command signal; and
   sending the scaled motor command signal to the motor.

5. The method of claim 1, wherein the active damping signal is partially defined by the first signal and the second signal.

6. A method for controlling a power steering system, the method including;
   receiving a first signal representative of a torque applied to a steering wheel;
   applying a first backlash function to the first signal, wherein the first backlash function includes a first adjustable deadband center and imparts a defined first hysteresis in the system, the first adjustable deadband center adjusts based on a value of the first signal and whether the value is increasing or decreasing;
   receiving a second signal representative of a motor velocity of a motor operatively linked to the steering wheel;
   applying a second backlash function to the second signal, wherein the second backlash function includes a second adjustable deadband center and imparts a defined second hysteresis in the system, the second adjustable deadband center adjusts on a value of the second signal and whether the value is increasing or decreasing;
   multiplying the first signal with the second signal resulting in a product signal;
   multiplying a defined first-third quadrant scaling factor with an active damping signal, and sending a resultant motor command signal to the motor responsive to determining that the product signal is a positive signal; and
   multiplying a defined second-fourth quadrant scaling factor with the active damping signal, and sending the resultant motor command signal to the motor responsive to determining that the product signal is a negative signal, wherein the first backlash function is defined as a current output=$y$, a current input=$x$, a previous output=$yprev$, and a deadband, d:

$$\text{if } x<yprev-d/2, y=x+d/2,$$

$$\text{else if } x<=yprev+d/2, y=yprev$$

$$\text{else } y=x-d/2.$$

7. A power steering system, comprising:
   a steering wheel;
   a motor operatively linked to the steering wheel;
   a torque sensor operatively linked to the motor;
   a processor configured to receive a first signal from the torque sensor representative of a torque applied to the steering wheel, apply a first backlash function to the first signal, wherein the first backlash function includes a first adjustable deadband center and imparts a defined first hysteresis in the system, the first adjustable deadband center adjusts based on a value of the first signal and whether the value is increasing or decreasing, receive a second signal from the motor representative of a motor velocity of a motor operatively linked to the steering wheel, convert the second signal to represent a motor velocity of the motor, apply a second backlash function to the second signal, wherein the second backlash function includes a second adjustable deadband center and imparts a defined second hysteresis in the system, multiply the first signal with the second signal resulting in a product signal, the second adjustable deadband center adjusts based on a value of the second signal and whether the value is increasing or decreasing, multiply a defined first-third quadrant scaling factor with an active damping signal, and send a resultant motor command signal to the motor responsive to determining that the product signal is a positive signal, and multiply a defined second-fourth quadrant scaling factor with the active damping signal, and send the resultant motor command signal to the motor responsive to determining that the product signal is a negative signal.

8. The system of claim 7, wherein the processor is further operative to:
   filter the first signal with a first low-pass filter responsive to converting the first signal; and
   filter the second signal with a second low-pass filter responsive to converting the second signal.

9. The system of claim 7, wherein the processor is further operative to:
   add a second damping signal to the resultant motor command signal to define a scaled motor command signal; and
   send the scaled motor command signal to the motor.

10. The system of claim 7, wherein the processor is further operative to:
adding a second torque signal to the resultant motor command signal to define a scaled motor command signal; and
sending the scaled motor command signal to the motor.

11. The system of claim 7, wherein the active damping signal is partially defined by the first signal and the second signal.

12. A power steering system, comprising:
a steering wheel;
a motor operatively linked to the steering wheel;
a torque sensor operatively linked to the motor;
a processor configured to receive a first signal from the torque sensor representative of a torque applied to the steering wheel, apply a first backlash function to the first signal, wherein the first backlash function includes a first adjustable deadband center and imparts a defined first hysteresis in the system, the first adjustable deadband center adjusts based on a value of the first signal and whether the value is increasing or decreasing, receive a second signal from the motor representative of a motor velocity of a motor operatively linked to the steering wheel, convert the second signal to represent a motor velocity of the motor, apply a second backlash function to the second signal, wherein the second backlash function includes a second adjustable deadband center and imparts a defined second hysteresis in the system, multiply the first signal with the second signal resulting in a product signal, the second adjustable deadband center adjusts based on a value of the second signal and whether the value is increasing or decreasing, multiply a defined first-third quadrant scaling factor with an active damping signal, and send a resultant motor command signal to the motor responsive to determining that the product signal is a positive signal, and multiply a defined second-fourth quadrant scaling factor with the active damping signal, and send the resultant motor command signal to the motor responsive to determining that the product signal is a negative signal, wherein the first backlash function is defined as a current output=y, a current input=x, a previous output=yprev, and a deadband, d:

if $x<y\text{prev}-d/2, y=x+d/2$, else if $x<=y\text{prev}+d/2, y=y\text{prev}$ else $y=x-d/2$.

13. A method for controlling a power steering system, the method including:
receiving a first signal representative of a torque applied to a steering wheel;
receiving a second signal representative of a motor velocity of a motor operatively linked to the steering wheel;
multiplying the first signal with the second signal resulting in a product signal;
applying a backlash function to the product signal, wherein the backlash function includes an adjustable deadband center and imparts a defined hysteresis in the system, the adjustable deadband center adjusts based on a value of the signal and whether the value is increasing or decreasing;
multiplying a defined first-third quadrant scaling factor with an active damping signal, and sending a resultant motor command signal to the motor responsive to determining that the product signal is a positive signal; and
multiplying a defined second-fourth quadrant scaling factor with the active damping signal, and sending the resultant motor command signal to the motor responsive to determining that the product signal is a negative signal, wherein the first backlash function is defined as a current output=y, a current input=x, a previous output=yprev, and a deadband, d:

if $x<y\text{prev}-d/2, y=x+d/2$, else if $x<=y\text{prev}+d/2, y=y\text{prev}$ else $y=x-d/2$.

\* \* \* \* \*